United States Patent Office 2,823,056
Patented Feb. 11, 1958

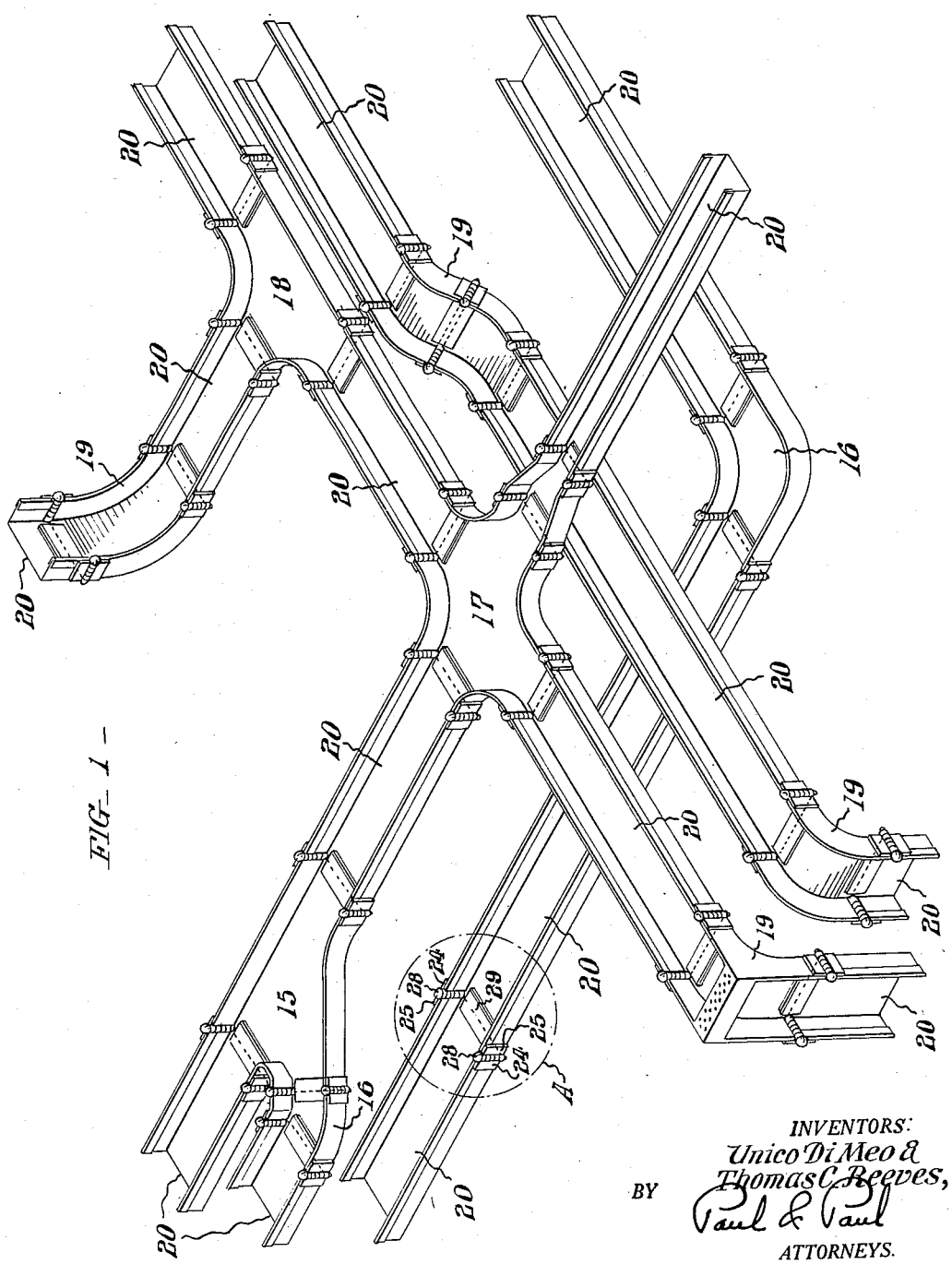

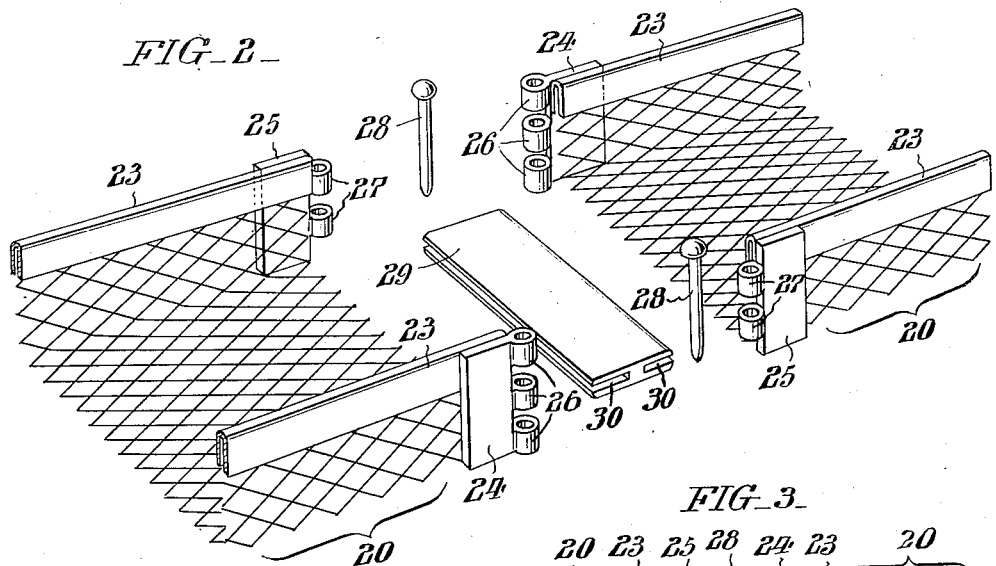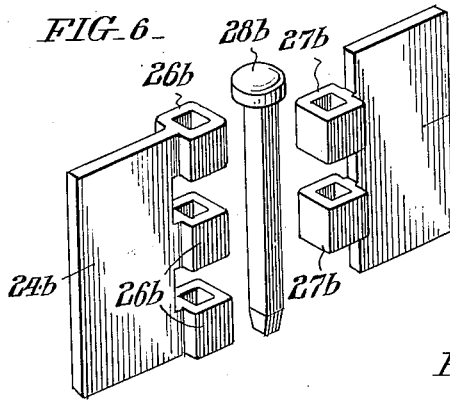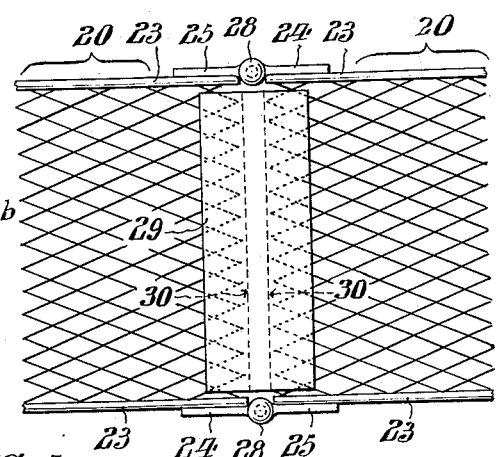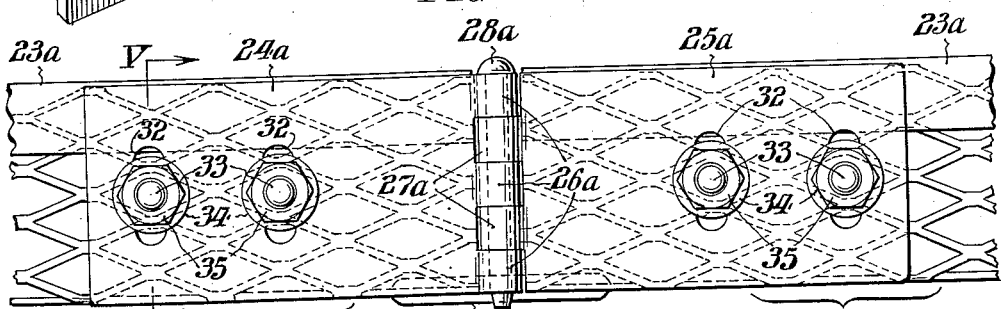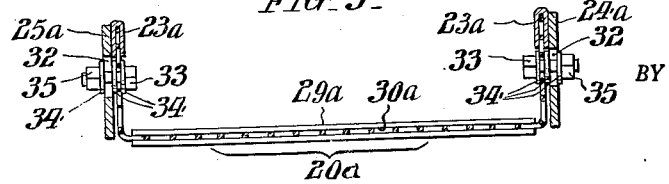

2,823,056

CONNECTING MEANS FOR CABLE-SUPPORTING TROUGH SYSTEMS AND THE LIKE

Unico Di Meo and Thomas C. Reeves, Philadelphia, Pa., assignors to T. J. Cope, Inc., Philadelphia, Pa., a corporation of Pennsylvania Application October 20, 1954, Serial No. 463,420

2 Claims. (Cl. 287—103)

This invention relates to connecting means for use in erecting or setting up trough systems for the support of control and power cables in electric power stations or of tubing in chemical processing plants and the like. More specifically, it is concerned with means for joining together, end to end, various pre-fabricated channel components of such systems, including straight-away sections, elbow fittings, T fittings, cross fittings etc., in a definite order or sequence with the channelling continuous or communicating, as may be necessary to meet special requirements likely to be met within practice.

Our invention has for its chief aim, the provision of a simple reliable and inexpensive means by which the different pre-fabricated component parts of trough systems of the kind referred to can be rigidly connected together in the field in a minimum of time, without necessitating employment of specially skilled help or the use of any special tools in assembling.

Other objects and attendant advantages will appear from the following detailed description of the attached drawings, wherein:

Fig. 1 is a fragmentary view in perspective of a cable or tube supporting trough system whereof the various pre-fabricated components are joined together, end to end, by connecting means conveniently embodying our invention in one form.

Fig. 2 is an exploded view in perspective showing the confronting ends of two straight-away channel components of the trough system at the region A in Fig. 1, together with the interengagable members of the connecting means of our invention.

Fig. 3 is a fragmentary view in top plan showing the straight-away channel components of Fig. 2 joined together by the connecting means.

Fig. 4 is a fragmentary view in side elevation drawn to a larger scale and showing two channel components joined together by a modified connecting means of our invention.

Fig. 5 is a cross section taken as indicated by the angled arrows V—V in Fig. 4; and Fig. 6 is an exploded view showing another modified form of our connecting means.

The cable or tube-supporting tray system exemplified in Fig. 1 is a typical one in which branch fittings 15, elbow fittings 16, cross fittings 17, T fittings 18 and drop fittings 19 are variously interposed between straight-away channel components 20 to form continuous or communicating ways into which the cables or tubes are to be laid.

In Figs. 2 and 3, we have illustrated how the confronting ends of two straight-away components 20 at the region A in Fig. 1 are joined together by one form of our improved connecting means, said components being shown as fashioned to channel configuration, in the instance, from expanded or reticulate sheet metal with the top edges of their side walls reinforced by permanently attached longitudinally-folded enveloping strips 23 of solid sheet metal. It is to be understood that our connecting means is equally useful applied to trough channel section of different specific construction, such as sections formed entirely of solid sheet metal or with solid sheet metal sides with expanded or reticulate metal bottoms and the like. As shown, the coupling means here includes, pairs of plate-like coupling members 24 and 25 which are permanently secured, as by welding, to the reinforcing strips and/or to the side walls of the channel components 20, the members of the respective pairs being formed with interengageable ear lugs 26 and 27 at their free edges. Upon interengagement of the ear lugs 26 and 27 of the members 24 and 25 and registry of the apertures in them, the shanks of headed locking pins 28 are passed downwardly through said lugs. The connecting means further includes a fairing element 29 which is struck from stiff plate metal with grooves 30 in its opposite longitudinal side edges to receive and marginally overlap the crosswise raw end edges of the connected channel components 20 as shown in Fig. 3. The fairing element 29 is inserted, of course, before the lugs of the coupling members 24 and 25 are interengaged and locked by the pins 28.

Coupling means of the form shown in Figs. 2 and 3 can be used as illustrated in Fig. 1, to connect the ends of the various straight-away channel components 20 to the confronting ends of the channel fittings 15, 16, 17, 18 and 19 in precisely the same manner as above described.

In the modification illustrated in Figs. 4 and 5, the plate-like coupling members 24a and 25a of the respective pairs are each provided with two vertically-spaced openings or slots 32, and are secured to the sides of the respective channel components 20a, 20a by headed screws 33 with associated washers 34 and draw nuts 35. In assembling, the coupling members 24a and 25a of the respective pairs are placed against the corresponding side walls of the trough lengths 20a, 20a and the shanks of the screws 33 passed first through interstices in the expanded metal of said trough lengths and then through the openings 32, whereafter the washers 34 and the nuts 35 are applied to the protruding ends of the screw shanks. It is to be understood that this modification is equally adaptable to trough channel constructions of solid sheet metal and of solid sheet combined with expanded metal and the like, provided that mounting holes are provided in the channel side walls. By virtue of the openings 32, it is possible to adjust the coupling members 24a, 25a as may be necessary to facilitate interengagement of their ears 26a, 27a for insertion of the locking pins 28a. Here, as in Figs. 2 and 3, a fairing element 29a, having grooves 30a in its opposite longitudinal side edges, serves as a bridge over the raw transverse end edges of the bottoms of the connected channel components 20a, 20a and also to strengthen the juncture transversely. The connector means of Figs. 4 and 5 is intended for use more particularly in coupling shorter cut lengths or straight-away trough components as may be required to suit different conditions met with incident to installation of trough systems in the field.

In the alternative embodiment depicted in Fig. 6 of the drawings, the lugs 26b and 27b of the plate-like coupling members 24b and 25b have polygonal apertures, and the shanks of the associated locking pins 28b are correspondingly configured in cross section. It is to be understood that the components 24b and 25b of Fig. 6 may be used if desired in lieu of those respectively shown in Figs. 2, 3 and Figs. 4, 5.

From the foregoing it will be seen that we have provided simple and effective means whereby the confronting ends of straight-away and other components of cable or tube supporting trough systems can be quickly connected together without the need for employing specially skilled help or the use of special tools other than an ordinary hammer and/or wrench. The same facility applies of course to disconnection of the trough components for the purpose of making desirable modifications in the trough system after its initial installation.

Having thus described our invention, we claim:

1. Means for connecting together, end to end, prefabricated channel trough units, comprising pairs of complementary plate-like components respectively having spaced ears in the planes thereof along one edge, the components of the respective pairs being fixedly secured to the outer sides of the longitudinal walls of the trough sections adjacent the confronting ends of the latter, with the ears projecting therebeyond and interengaged; and locking pins passed through the registering ears on the components of the respective connecting pairs.

2. The invention according to claim 1, reticulate trough sections are fashioned from sheet metal and their longitudinal walls are reinforced downwardly of their top edges by overlapping strips of solid sheet metal, and wherein the plate-like components of the respective pairs of connecting devices are welded to the reinfrocing strips of the respective trough units.

References Cited in the file of this patent

UNITED STATES PATENTS

| 255,809 | Pfauntz | Apr. 4, 1882 |
| 695,677 | Faris | Mar. 18, 1902 |
| 1,239,848 | Townsend | Sept. 11, 1917 |
| 1,625,612 | Jensen | Apr. 19, 1927 |
| 1,923,721 | Glenn | Aug. 22, 1933 |
| 2,321,566 | Wilson | June 15, 1943 |
| 2,379,179 | Peterson | June 26, 1945 |
| 2,432,396 | Earhart | Dec. 9, 1947 |
| 2,567,554 | Davey | Sept. 11, 1951 |
| 2,656,998 | Ullberg | Oct. 27, 1953 |
| 2,744,590 | Butts | May 8, 1956 |

FOREIGN PATENTS

| 553,797 | France | Feb. 16, 1923 |